Nov. 16, 1965     F. DUMAS ETAL     3,217,821
POWER PLANT FOR LAND VEHICLES
Filed Sept. 10, 1963
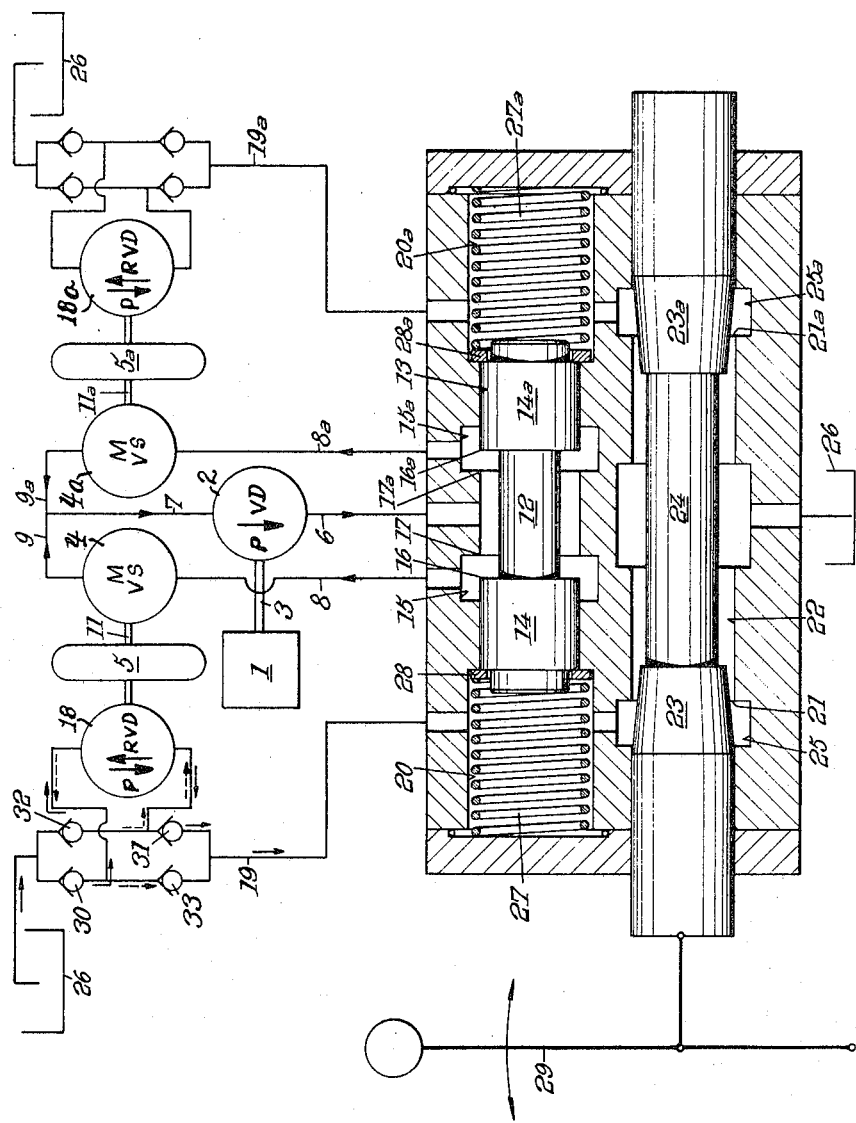
INVENTOR
FRANÇOIS DUMAS
GEORGES BITTON
BY
Bailey, Stephens & Huettig
ATTORNEYS United States Patent Office 3,217,821
Patented Nov. 16, 1965

3,217,821
POWER PLANT FOR LAND VEHICLES
François Dumas, Villeurbanne, and Georges Bitton, Lyon, France, assignors to Societe Industrielle Generale de Mecanique Appliquee S.I.G.M.A., Paris, France, a society of France
Filed Sept. 10, 1963, Ser. No. 307,928
Claims priority, application France, Sept. 15, 1962, 909,598
3 Claims. (Cl. 180—6.48)

The invention relates to power plates for land vehicles comprising an internal combustion engine and a hydraulic transmission in the form of a pump driven by said engine, two hydraulic motors mechanically coupled with driving wheels or the equivalent disposed respectively on the right-hand and left-hand sides of the vehicle, ducts connecting the pump with the hydraulic motors by way of two closed circuits in shunt with each other, and means for dividing the liquid between the two said circuits.

The chief object of our invention is to provide a power plant of this kind with which different speeds may be transmitted to the wheels or the like in proportion to the radius of any curve which the vehicle may have to negotiate.

An embodiment of our invention will be hereinafter described with reference to the single figure forming the accompanying drawing and diagrammatically illustrating a power plant according to the invention, some parts, in section being shown on an enlarged scale.

The installation according to the invention mainly comprises an internal combustion engine 1 and a hydraulic transmission comprising a pump 2 driven by engine 1 through shaft 3, two hydraulic motors 4, 4a each mechanically coupled with a vehicle driving wheel or endless track 5, 5a, a delivery duct 6 and a return duct 7 arranged as a closed circuit between the pump 2 and the two hydraulic motors 4, 4a. As will be described hereinafter, duct 6 acts as a delivery duct, and duct 7 as a return duct, when the vehicle travels forwards; the functions of the ducts 6, 7 are changed over when the vehicle travels in reverse.

As the drawing shows, hydraulic motors 4, 4a are supplied in parallel through two branches 8, 8a of the delivery duct 6 and deliver liquid in parallel to two branches 9, 9a of the return duct 7. The normal direction of flow of the liquid in the main cricuit—(forward drive) is diagrammatically indicated by arrows. This direction is reversed for backward drive, the direction of rotation of pump 2 being then reversed by the driver.

To provide a variable-ratio transmission, pump 2 is so devised that the volume which it delivers per revolution of its driving shaft 3 can be varied. Such a pump is familiar to those skilled in the art. If required, hydraulic motors 4, 4a can also be so devised that the volume of liquid they absorb per revolution of their driven shafts 11, 11a respectively can be varied. Means are provided for dividing the transmission liquid flow between the two respective circuits 6, 8, 4, 9, 7 and 6, 8a, 4a, 9a, 7. Said means consist of a spool valve 12 slidable in a bore 13 and so devised that when moved in one direction it causes a local cross section reduction in one of said circuits and a local cross section increase in the other. To this end, the stem of spool 12 carries two lands 14, 14a of greater diameter than said stem and which project into grooves 15, 15 of bore 13 connecting it with branches 8, 8a respectively. When spoon 12 is moved toward the right, the annular gap between the inner edge 16 of land 14 and the inner edge 17 of groove 15 has its cross-section reduced, whereas the annular passage between the inner edge 16a of land 14a and the inner edge 17a of groove 15a has its cross-section increased. Consequently, the delivery from pump 2 to hydraulic motor 4 decreases. with a consequent decrease in the speed of said motor and the delivery to hydraulic motor 4a correspondingly increases, with a consequent acceleration of said motor.

According to the invention, the flow-dividing means—i.e. spool 12—is controlled by means responsive to the difference between the respective delivery pressures of pumps 18 and 18a driven by wheels 5, 5a respectively and each delivering liquid through throttled passages determining the value of its delivery pressure, and a mechanism is provided for making the cross-sections of the two throttled passages either equal to each other (straight travel of the vehicle) or different from each other (vehicle negotiating a curve).

According to an advantageous construction, illustrated by the drawings, the delivery ducts 19, 19a of pumps 18, 18a include, on the one hand, chambers 20, 20a forming the end portions of bore 13, on the outer sides of lands 14, 14a respectively, and, on the other hand, the above mentioned throttled passages 21, 21a, of annular shape, provided between the edges of a bore 22 and the conical surfaces 23, 23a, of valve member 24 slidable in bore 22. Bore 22 extends beyond said edges to form grooves 25, 25a communicating with chambers 20, 20a, respectively. In its central part bore 22 communicates with a tank 26 supplying pumps 18, 18a (to simplify the drawing, the same tank 26 is shown at three different places).

Spool 12 is subjected to the action of spring means tending to return it to its central position. Said spring means consist of two springs 27, 27a housed in chambers 20, 20a and which bear against washers 28, 28a bearing against the lands 14 of spool 12.

Valve member 24 can be controlled in various ways, depending upon the kind of vehicle on which the installation is used. If the vehicle has nonsteerable wheels—i.e., if changes in vehicle direction are produced by causing the wheels on one side of the vehicle to run at one speed and the wheels on the other side of the vehicle to run at another speed—valve member 24 is operated by a steering lever 29, controlled by the driver. If the vehicle has steerable wheels, valve member 24 can be controlled by the element (wheel or lever) controlling the position of the steerable wheels so as to make the speed of the driving wheels on the outside of the curve greater than the speed of the driving wheels on the inside of the curve.

In order that the installation may drive the vehicle in reverse gear as well as forwards, non-return valves 30, 31 and 32, 33 can be provided, on the one hand, between the tank 26 and each pump 18, 18a and, on the other hand, between the pumps 18, 18a and the delivery ducts 19, 19a. The valves 30, 31 permit the flow of liquid when the pump 18 or 18a runs in a direction corresponding to forwards travel (direction of circulation diagrammatically illustrated by solid-line arrows), and the valves 32, 33 open for a flow of liquid corresponding to rotation of the last-mentioned pumps in the opposed direction (direction of circulation modified as diagrammatically illustrated by broken-line arrows).

This power plant works as follows:

Assuming first that the vehicle is travelling straight-ahead and forwards, the valve member 24 is in the central position shown, in which position the cross-sections of throttle passages 21, 21a are equal to each other. Normally, the wheels 5, 5a, and therefore the pumps 18, 18a, rotate at equal speeds. The pressures on each side of spool acting on lands 14, 14a balance each other and so the valve member 12 too is in the central position illustrated, in which position it divides the delivery from pump 2 equally between the hydraulic motors 4, 4a.

If one of the wheels, for instance the wheel 5, starts to slip, the corresponding pump 18 increases its speed. The pressure therefore increases in the chamber 20 above the pressure in the chamber 20a and moves spool 12 to the right, so that the delivery to the hydraulic motor 4 driving the slipping wheel 5 is reduced as compared the delivery to the hydraulic motor 4a driving the other wheel, so that there is an automatic anti-slip or anti-skid action. Of course, the procedure is similar if the wheel 5a starts to skid.

Assuming now that the vehicle is negotiating a curve and travelling forwards, the valve member 24 is moved from its central position, for instance, to the right in the drawing (wheel 5 on the inside of the curve). The cross-section of throttled passage 21 drops below that of passage 21a. The corresponding pressure increase in the chamber 20 shifts the spool 12 to the right so that the delivery to the hydraulic motor 4a is greater than the delivery to the hydraulic motor 4. For a given position of valve member 24, corresponding to a given turn, there is normally a relationship between the speeds of the wheels 5 and 5a corresponding to the differences between the travels of the wheels on the outside and of those on the inside of the curve. For a given steering turn this speed relationship is constant provided that the wheels grip the ground satisfactorily. If a wheel tends to slip, automatic correction is provided by spool 12 moving laterally, as just described with reference to straight-ahead travel of the vehicle, the only difference being that in this case the balance position of the valve member 12 is not central.

When the vehicle travels backwards, operation is as just described except that the liquid delivered by the pumps 18, 18a travels along a different path through the non-return valves 30–33, as previously explained, and that the distribution of the liquid stream between the hydraulic motors 4, 4a is made on the return path to pump 2 and not on the delivery thereof (direction of circulation reverse as compared with the arrows in the drawing, in the circuits 7, 9, 8, 6 and 7, 9a, 8a, 6).

The power plant according to the invention has in any case many and substantial advantages which have been adequately described in the foregoing.

Of course, and as the foregoing shows, the invention is not limited to those of its applications nor to those embodiments of its various parts which have been more particularly considered and covers all possible modifications thereof within the scope of the appended claims.

We claim:

1. In a land vehicle having driven vehicle propelling members disposed respectively on the right hand side and the left hand side of the vehicle, a power plant for driving said propelling members which comprises, in combination,
   an internal combustion engine,
   a variable delivery pump driven by said engine,
   two hydraulic motors each mechanicaly coupled with one of said propelling members, respectively,
   a first and a second hydraulic circuit connecting the delivery of said pump with said two respective hydraulic motors in parallel, respectively,
   two pumps mechanically connected with the vehicle propelling members, respectively, for being driven by them,
   two distinct delivery circuits for the two second mentioned pumps respectively, including each a variable section throttled passage,
   valve means for controlling both of said hydraulic circuits to distribute between them the flow of said first mentioned pump,
   means operative by the pressures in said respectively delivery circuits for controlling said valve means in response to the difference of the respective delivery pressures of the two second mentioned pumps,
   and manually operated means for controlling said two throttled passages.

2. In a land vehicle having driven vehicle propelling members disposed respectively on the right hand side and the left hand side of the vehicle, a power plant for driving said propelling members which comprises, in combination,
   an internal combustion engine,
   a variable delivery pump driven by said engine,
   a cylindrical casing fixed with respect to said pump including a bore coaxial therewith,
   a spool slidable in said bore to limit therein a central chamber and two end chambers,
   two hydraulic motors each mechanically coupled with one of said propelling members, resepctively,
   a first and a second hydraulic circuit connecting the delivery of said pump with said two respective hydraulic motors in parallel, respectively,
   said hydraulic circuits including each a portion of said central chamber, respectively,
   said spool and said bore being so shaped that, when said spool is moved in one direction in said bore, it reduces a cross section area of one of said central chamber portions while increasing that of the other,
   two pumps mechanically connected with the vehicle propelling members, respectively, for being driven by them,
   two distinct delivery circuits for the two last mentioned pumps, respectively, both of said delivery circuits including a common delivery chamber and each of them including, between each of said two last mentioned pumps and said common delivery chamber, one of said bore end chambers,
   throttling means in each of said delivery circuits,
   a liquid delivery tank communicating with said common delivery chamber, and
   manually operated means for simultaneously controlling both of said two throttling means so as to open one while correspondingly closing the other.

3. In a land vehicle having driven vehicle propelling members disposed respectively on the right hand side and the left hand side of the vehicle, a power plant for driving said propelling members which comprises, in combination,
   an internal combustion engine,
   a variable delivery pump driven by said engine,
   a cylindrical casing fixed with respect to said pumps including a bore coaxial therewith,
   a spool slidable in said bore to limit therin a central chamber and two end chambers,
   two hydraulic motors each mechanically coupled with one of said propelling members, respectively,
   a first and a second hydraulic circuit connecting the delivery of said pump with said two respective hydraulic motors in parallel, respectively,
   said hydraulic circuits including each a portion of said central chambers, respectively,
   said spool and said bore being so shaped that when said spool is moved in one direction in said bore, it reduces a cross section area of one of said central chamber portions while increasing that of the other,
   two pumps mechanically connected with the vehicle propelling members, respectively, for being driven by them, two distinct delivery circuits for the two last mentioned pumps, respectively, each of said delivery circuits including one of said bore end chambers, respectively, a second fixed cylindrical casing including two annular grooves at the respective ends thereof, said grooves being in communication with said end chambers, a valve member coaxially slidable in said second casing, said valve member including two portions of variable longitudinal section adapted to cooperate with said grooves to form variable throttled passages between themselves and the edges of said grooves, the intermediate portion of said second casing forming a common delivery chamber for both of said delivery circuits, a liquid tank communicating with said common delivery chamber, and a manually operative control member for slidably moving said valve member in said second casing so as simultaneously to control both of said two throttled passages to open one while correspondingly closing the other.

References Cited by the Examiner
UNITED STATES PATENTS

| | | | |
|---|---|---|---|
| 2,846,849 | 8/1958 | Levetus et al. | 60—53 |
| 3,085,403 | 4/1963 | Hamblin et al. | 180—6.48 X |
| 3,114,424 | 12/1963 | Vorveaux et al. | 180—6.3 |
| 3,138,218 | 6/1964 | Mark et al. | 180—6.3 |

BENJAMIN HERSH, *Primary Examiner.*

A. HARRY LEVY, *Examiner.*